United States Patent [19]
Rudolph

[11] Patent Number: 5,346,191
[45] Date of Patent: Sep. 13, 1994

[54] HYDRAULICALLY DAMPING RUBBER ENGINE MOUNT

[75] Inventor: Axel Rudolph, Bensheim, Fed. Rep. of Germany

[73] Assignee: Firma Carl Freudenberg, Weinheim/Bergstr., Fed. Rep. of Germany

[21] Appl. No.: 55,855

[22] Filed: Apr. 30, 1993

[30] Foreign Application Priority Data

Aug. 29, 1992 [DE] Fed. Rep. of Germany ....... 4228842

[51] Int. Cl.$^5$ ............................................. F16F 7/00
[52] U.S. Cl. ................... 267/140.12; 267/35; 267/141.2
[58] Field of Search ............... 267/140.11, 140.12, 267/35, 219, 293, 141.2; 248/562, 636

[56] References Cited

U.S. PATENT DOCUMENTS

| | | | |
|---|---|---|---|
| 4,342,446 | 8/1982 | Eaton et al. | 267/35 |
| 4,352,487 | 10/1982 | Shtarkman | 248/562 X |
| 4,872,650 | 10/1989 | Tabata et al. | 267/140.12 |
| 4,895,353 | 1/1990 | Roth et al. | 267/140.12 |
| 5,044,813 | 9/1991 | Gregg | 267/140.12 X |
| 5,098,072 | 3/1992 | Muramatsu et al. | 267/140.12 |

FOREIGN PATENT DOCUMENTS 306369  3/1989 European Pat. Off. ....... 267/140.12

*Primary Examiner*—Robert J. Oberleitner
*Assistant Examiner*—Kevin D. Rutherford
*Attorney, Agent, or Firm*—Felfe & Lynch

[57] ABSTRACT

Hydraulically damping rubber engine mount comprising an inner tube (1) and an outer tube (2) surrounding the inner tube at a radial distance therefrom, the tubes being joined together by a rubber-elastic cushion (3) having two liquid-filled working chambers (4, 5) separated from one another by a dividing wall (6) capable of vibration and are joined to one another by at least one connecting passage (7). A gas-filled cavity (8) is disposed within the first working chamber (4) and defined by inflatable walls which have in at least a partial area an opening to the atmosphere and are surrounded at least partially by the working chamber.

13 Claims, 8 Drawing Sheets

HYDRAULICALLY DAMPING RUBBER ENGINE MOUNT

BACKGROUND OF THE INVENTION

The invention relates to a hydraulically damping rubber engine mount comprising an inner tube and an outer tube surrounding the inner tube at a radial distance therefrom, the tubes being joined together by a rubber-elastic cushion. At least two liquid-filled working chambers are separated from one another by a wall capable of vibration and are joined to one another by at least one connecting passage, and at least one gas-filled cavity is separated from the working chambers.

Such a rubber engine mount is disclosed in U.S. Pat. No. 4,872,650. The known rubber engine mount is designed especially for mounting an engine in a motor vehicle body. On opposite sides of the inner tube there is shown on the one hand a gas-filled cavity and on the other hand two working chambers joined to one another in a liquid-carrying manner through a damping orifice. The working chambers for the isolation of high-frequency vibrations are separated from one another by a diaphragm. Manufacture of the known rubber engine mount is not very satisfactory from the production viewpoint nor from the economical viewpoint.

SUMMARY OF THE INVENTION

The invention is addressed to simplified manufacture especially in the area of the working chambers, better manufacture from the economical and production viewpoints, and a wider-band isolation of higher-frequency vibrations to improve its practical characteristics.

To achieve a wider-band isolation of higher-frequency vibrations of low amplitude as well as a simpler construction of the rubber engine mount, the gas-filled cavity is disposed within the first working chamber and defined by inflatable walls having at least in a partial area an opening to the atmosphere, and the cavity is at least partially surrounded by the first working chamber. Upon the introduction of low-frequency vibrations of great amplitude, a displacement of liquid between the two working chambers through the connecting passage takes place to damp the vibrations. Higher-frequency vibrations of low amplitude are isolated by a deflection of the dividing wall between the working chambers, while the elastomerically deformable, gas-filled cavity absorbs the difference volumes with negligibly low resistance, in a virtually pressure-free manner.

With regard to easy and low-cost manufacture, the cushion can be an integrally vulcanized piece which surrounds the circumference of the inner tube and with the outer tube defines the connecting orifice.

In accordance with a particularly simple embodiment, the elastic walls which define the gas filled cavity and the diaphragm separating the working chambers can be formed in a single piece with the vulcanizable cushion. The rubber engine mount then involves only three components.

The inner tube and the cushion which is a vulcanized part and contains all components essential for operation are associated with one another in an elastically yielding manner and can be inserted axially into the outer tube. Then the working chambers are filled with fluid and the outer tube is crimped toward the inner tube. The use of separately made connecting orifices between the two working chambers can thus be dispensed with.

According to another embodiment, the cushion can have an integrally formed recess for a dividing wall that can be inserted therein, which during use is held in position by a catch which is also integral with the cushion. Here it is advantageous that the dividing wall can be installed quite simply into the rubber engine mount and, in the preassembled state, before the cushion and the inner tube are inserted into the outer tube, it can be reliably held in its position. The catch can be formed, for example, by a hook-like projection on the cushion, behind which the dividing wall can snap when it is installed in the recess.

The dividing wall, which can be diaphragm-like, can be held with clearance at its circumferential edge by the recess, while the pocket and/or the dividing wall can be provided at their abutment surfaces with buffers to prevent clashing noises. Upon the introduction of high-frequency vibrations of low amplitude, the dividing wall will move within its clearance, so that no dynamic stiffening will occur. If, however, low-frequency vibrations of great amplitude are introduced, then, after the clearance of the dividing wall within the recess is overcome, fluid is pumped through the connecting orifices and good damping of the vibrations is achieved. Arranging the dividing wall within the cushion can be done in different ways and depends essentially on the particular circumstances of the application.

According to another embodiment, the dividing wall can be gripped in the pocket at its circumferential edge and can consist of a diaphragm-like rubber-elastic material. In this case, however, it is to be noted that clashing noises are completely forestalled, but that the installation of the dividing wall in the pocket is more difficult than when the pocket holds the dividing wall with clearance.

The dividing wall may be a diaphragm of rubber-elastic material disposed between two stiff perforated plates, the perforated plates being placed adjacent the diaphragm in the direction of vibration, with clearance. This embodiment is of great importance for the isolation of high-frequency vibrations. In addition, the diaphragm can be provided, for example, with at least one opening, so that there will be another liquid-conveying connection between the two working chambers in addition to the connecting passage between the two working chambers. Depending on the particular circumstances of the application, the additional liquid-conveying connection between the two working chambers can be provided with a valve, so that for example a different damping characteristic can be achieved when the engine mount is subjected to push and pull action.

The cushion can have on the side facing the adjacent second working chamber at least one gas-filled cavity running substantially parallel to the surface of the cushion that connects the inner tube and the outer tube to one another. Upon the introduction of abrupt inputs of very great amplitudes, the recess provided in addition to the gas-filled cavity prevents excessive stiffening of the component. Depending on the thickness of the material of the cushion that is between the cavity and the liquid-filled working chamber adjacent thereto, shocks can be taken up in conjunction with this chamber wall.

To limit radial deflections of the inner tube toward the side facing away from the working chambers, a second cavity can be provided in which a buffer made in one piece with the cushion is provided, which points radially from the outer tube toward the inner tube. Buffers of this kind can be combined, for example, with an additional end position damper in the form of a liquid-filled recess underneath the buffer. If the recess has a liquid-carrying connection to at least one of the two working chambers the result will be two damping maxima, which in many applications is advantageous.

To achieve especially easy assembly, the inner tube, the cushion and the dividing wall are designed as an insert which can be preassembled, and can be introduced axially into the outside tube and, after the working chambers are filled with damping liquid, can be locked therein. The insert can be locked to the outside tube by crimping the outer tube radially inward, thereby achieving at the same time a reliable sealing of the working chambers and connecting passage in the outer tube.

Depending on the circumstances of the particular application, the dividing wall can be pierced with valve-like openings. The openings can be formed by flap-valve-like tongues in a rubber-elastic diaphragm which facilitate the exchange of fluids between the two adjacent working chambers upon the introduction of low-frequency vibrations of great amplitude. The valve-like openings in the dividing wall can, in another embodiment, be formed so that they permit passage of the liquid in only one direction. Differently made push-pull stages for damping low-frequency vibrations can thus be achieved, and also for example by valves disposed within the connecting orifice between the working chambers.

DETAILED DESCRIPTION OF THE PREFERRED EMBODIMENT

Figure 1:
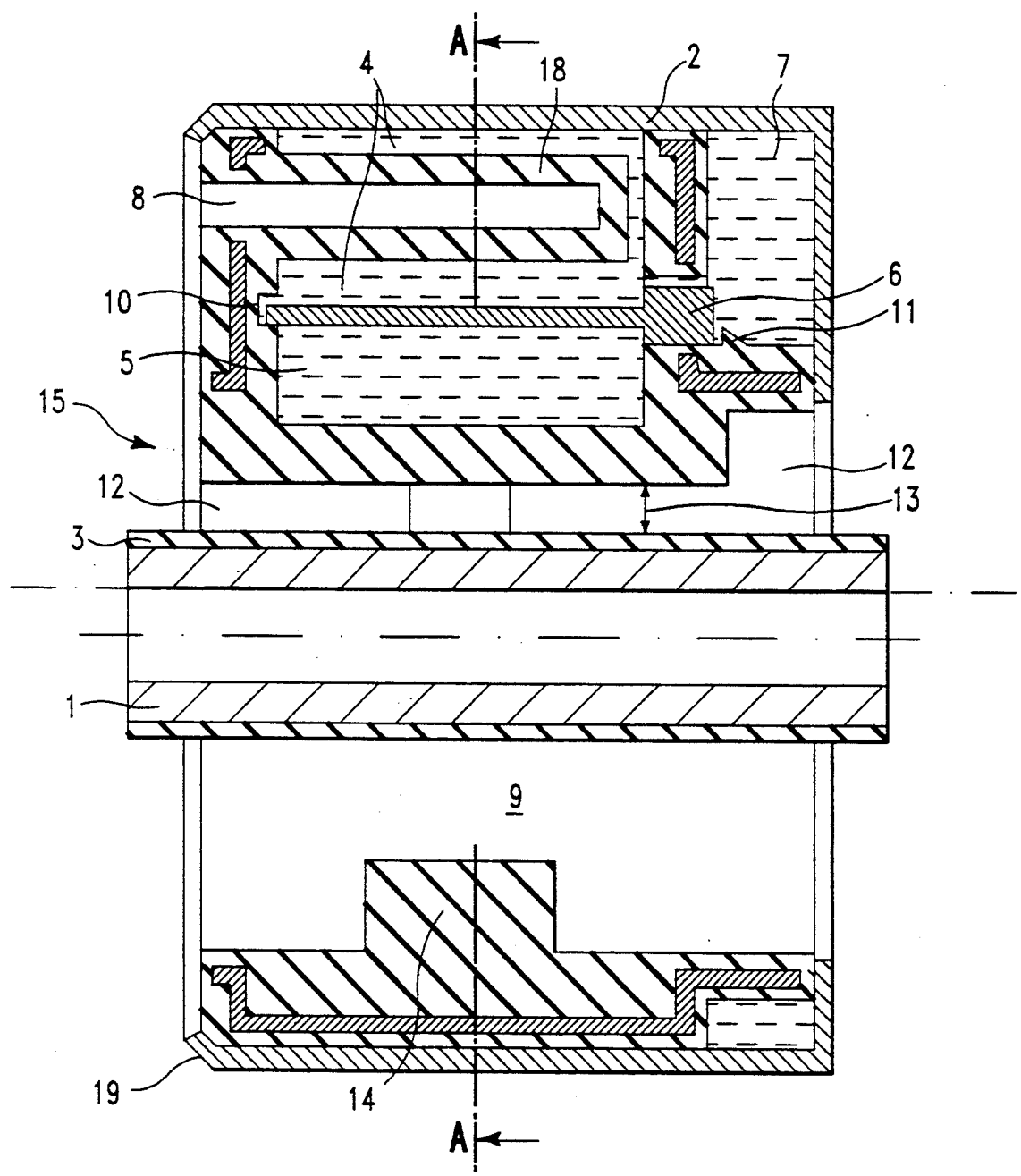
FIG. 1 is an axial section of an embodiment of a rubber engine mount.
Figure 2:
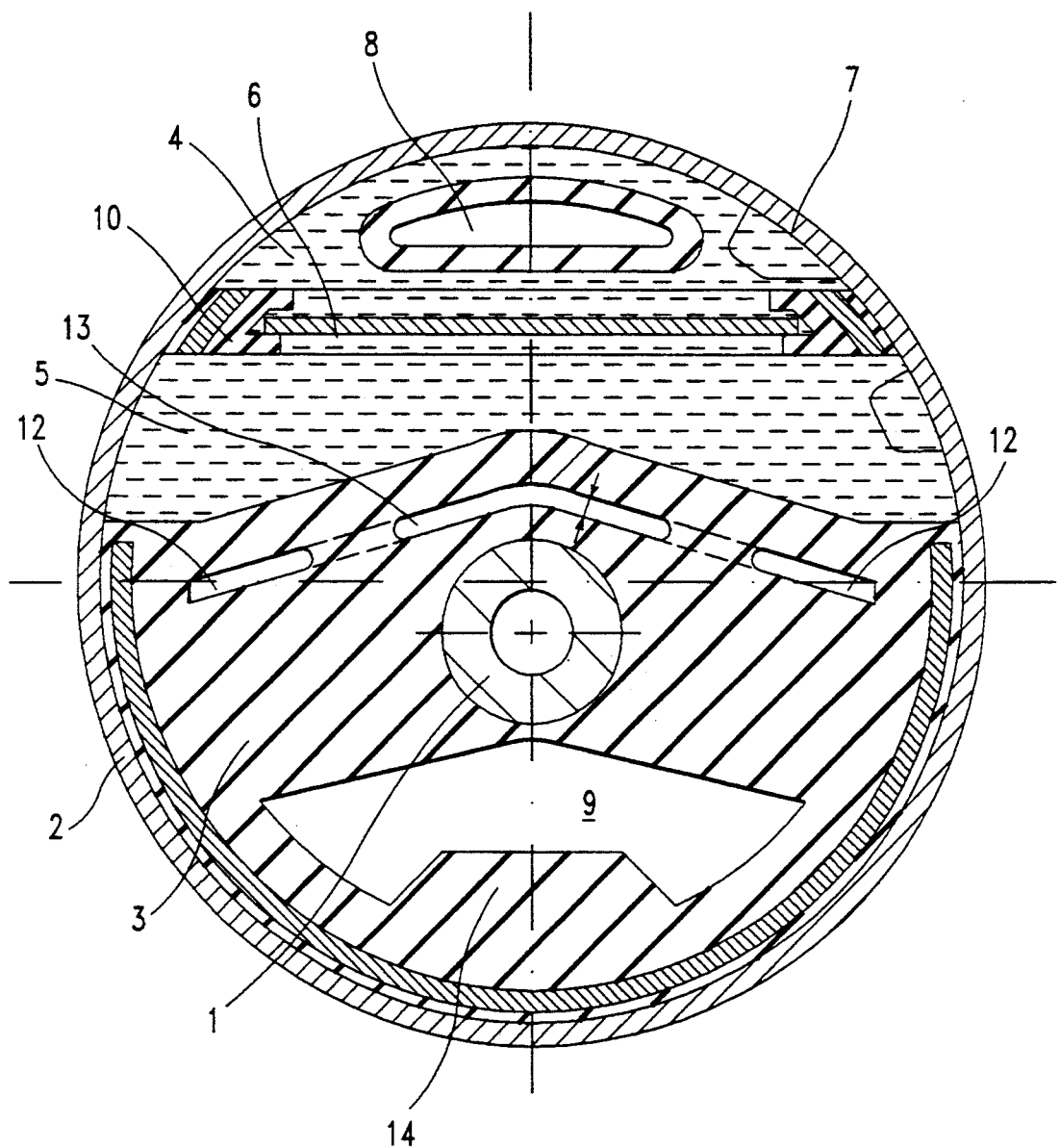
FIG. 2 is an end section of the rubber engine mount taken along line A—A in FIG. 1.

In FIGS. 1 and 2 there is shown an example of a rubber engine mount according to the invention, which consists of only four parts. The inner tube i is surrounded by a rubber-elastic cushion 3, the cushion 3 being supported externally and radially in an outer tube 2, and reinforced internally by metal inserts. The cushion 3 radially defines on the one side of the inner tube 1 only two liquid-filled working chambers 4 and 5 which are separated from one another by a vibratable dividing wall 6 and are connected in a liquid-carrying manner to one another by a connecting passage 7. Within the first working chamber 4 there is a pocket 18 formed integrally with cushion 3 and defining a gas-filled cavity 8 which is open in the axial direction at one end and in communication with the atmosphere, and damping liquid presses against it on the surface facing the first working chamber 4. For the isolation of acoustically undesirable high-frequency vibrations of low amplitude, the dividing wall 6 is disposed with clearance in a recess 10 which is made integral with the cushion 3. In order to assure the greatest possible ease of assembly, a catch 11 which can snap behind the dividing wall 6 upon assembly is also formed in cushion 3. In addition to the arrangement of the dividing wall 6 in the recess 10 as here represented, it is possible to provide buffers on one of the two parts to prevent clashing noises. It is also possible for the dividing wall 6 to be gripped in the recess 10 if the material of the dividing wall 6 has a flexibility adapted to the requirements. To assist in the isolation of high-frequency vibrations in a wide frequency range, openings 12 are provided within the cushion 3, which like the cavity 8 are gas-filled and connected to the atmosphere. Valve-like openings may also be provided in the dividing wall 6 between the first hydraulic chamber 4 and the second hydraulic chamber 5.

The assembly of the rubber engine mount is especially easy, since three of the four components used can be pre-assembled to form a plug-in assembly 15 which then can be inserted into the outer tube 2. The rubber engine mount here represented has very good practical properties over a long period of use and is extraordinarily easy to manufacture.

Figure 3:
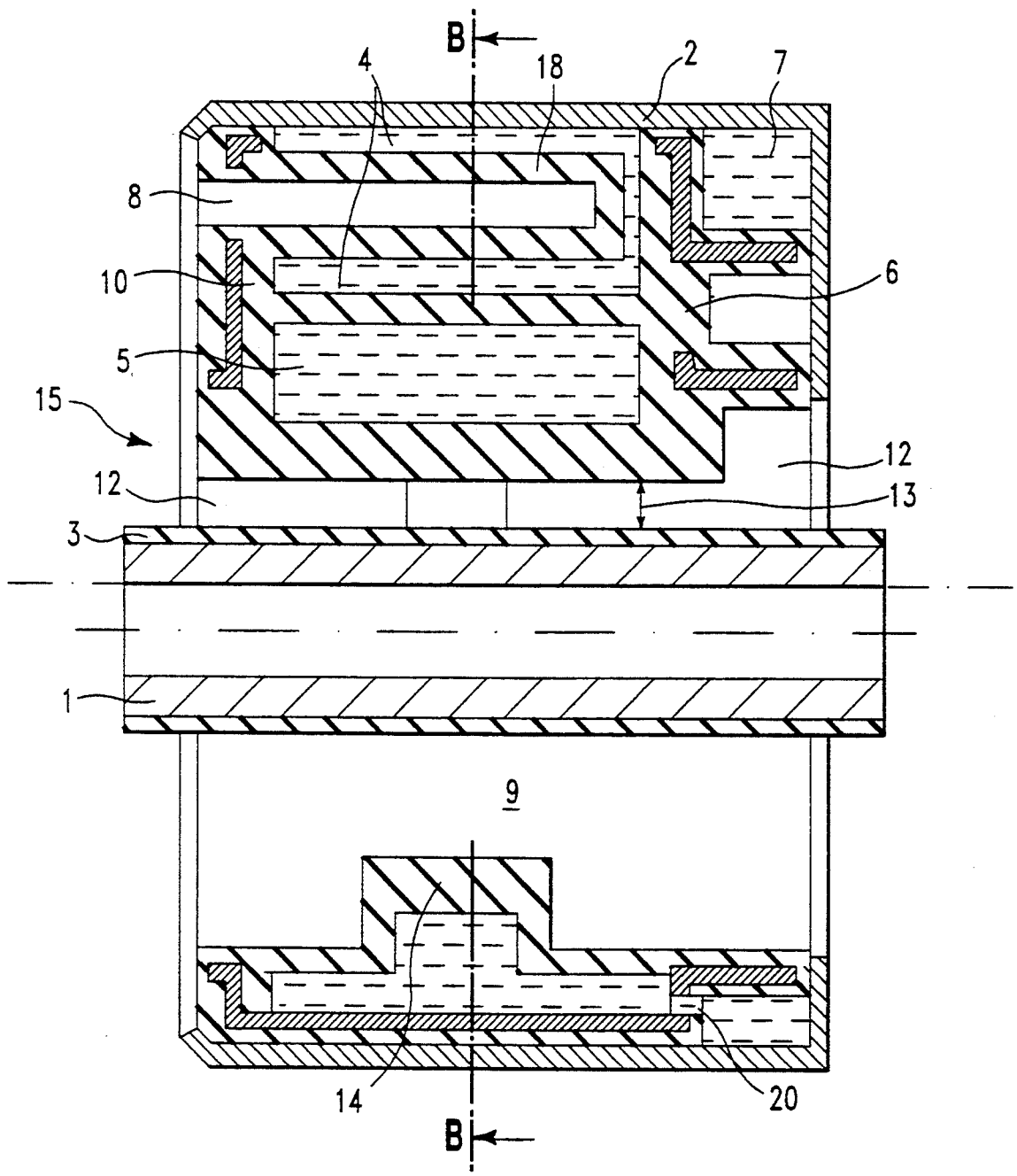
FIG. 3 is an axial section of a rubber engine mount similar to the embodiment in FIGS. 1 and 2, wherein the structure is further simplified by the integral configuration of the cushion with the dividing wall.
Figure 4:
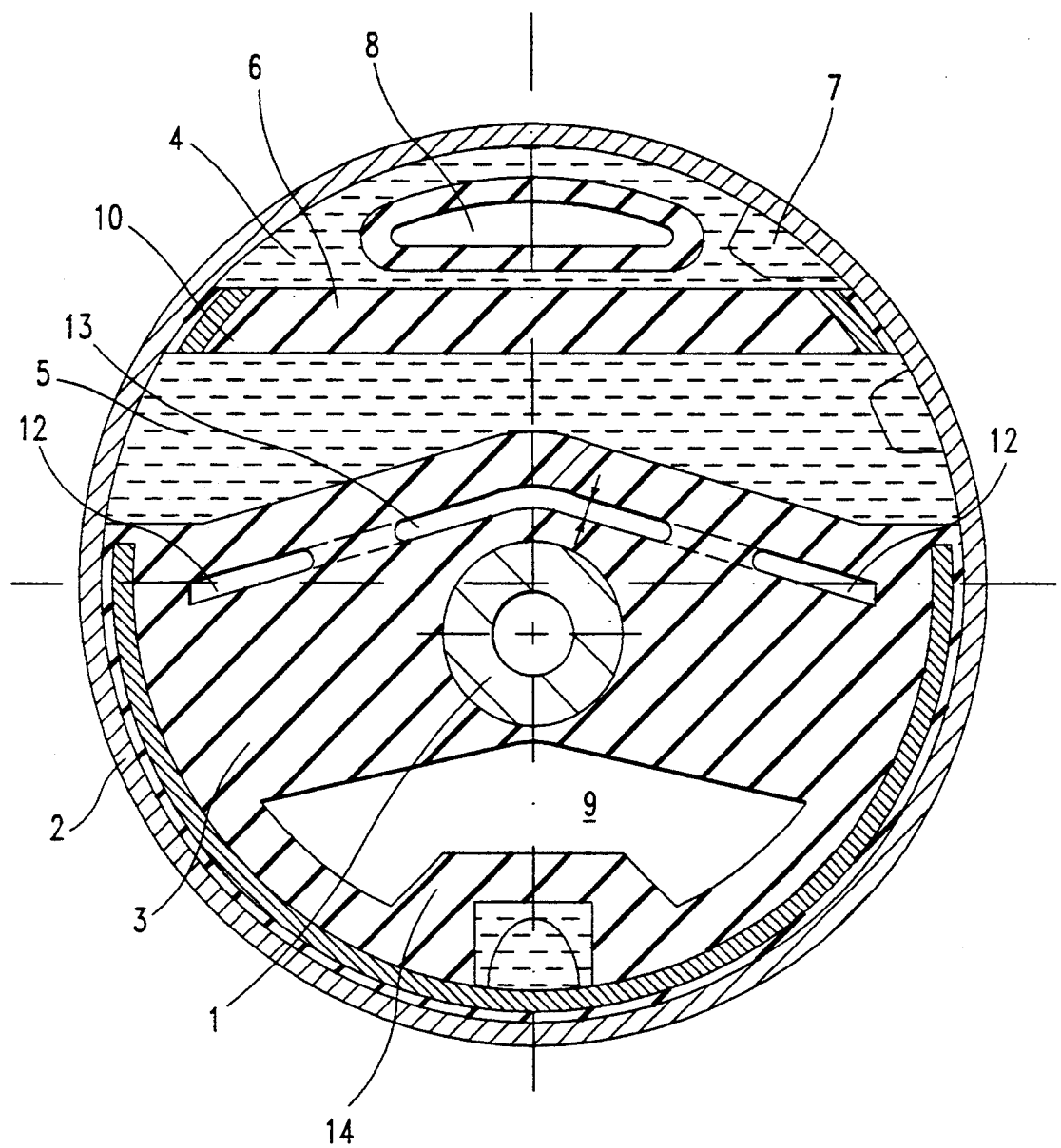
FIG. 4 is an end section of the rubber engine mount taken along line B—B in FIG. 3.

In FIGS. 3 and 4 is shown another embodiment of the rubber engine mount, whose operation is substantially the same as that of the embodiment in FIGS. 1 and 2. Unlike the embodiment in FIGS. 1 and 2, the engine mount shown here consists of only three parts. The inner tube 1 is vulcanized into the rubber-elastic cushion 3 and surrounded by it along its entire axial length on its outer circumference. The dividing wall 6 is integral with the cushion 3 and separates the two working chambers 4 and 5 which are connected in a liquid-conveying manner by the connecting passage 7. For the achievement of good end-position damping, an opening 20 is provided between the outer tube 2 and the surface of the buffer 14 facing the inner tube 1 and communicates in a liquid-conveying manner to the connecting passage 7. In addition to the end position damping, it is an advantage in this case that a second damping maximum is achieved by the liquid-carrying communication of the opening 20 with the connecting passage 7 between the working chambers 4 and 5. The second cavity 9 is open to the atmosphere like the first cavity 8. The flexibility of the dividing wall 6 is dependent upon the high-frequency vibrations which are to be isolated, and is therefore tuned to the particular circumstances of the application.

Figure 5:
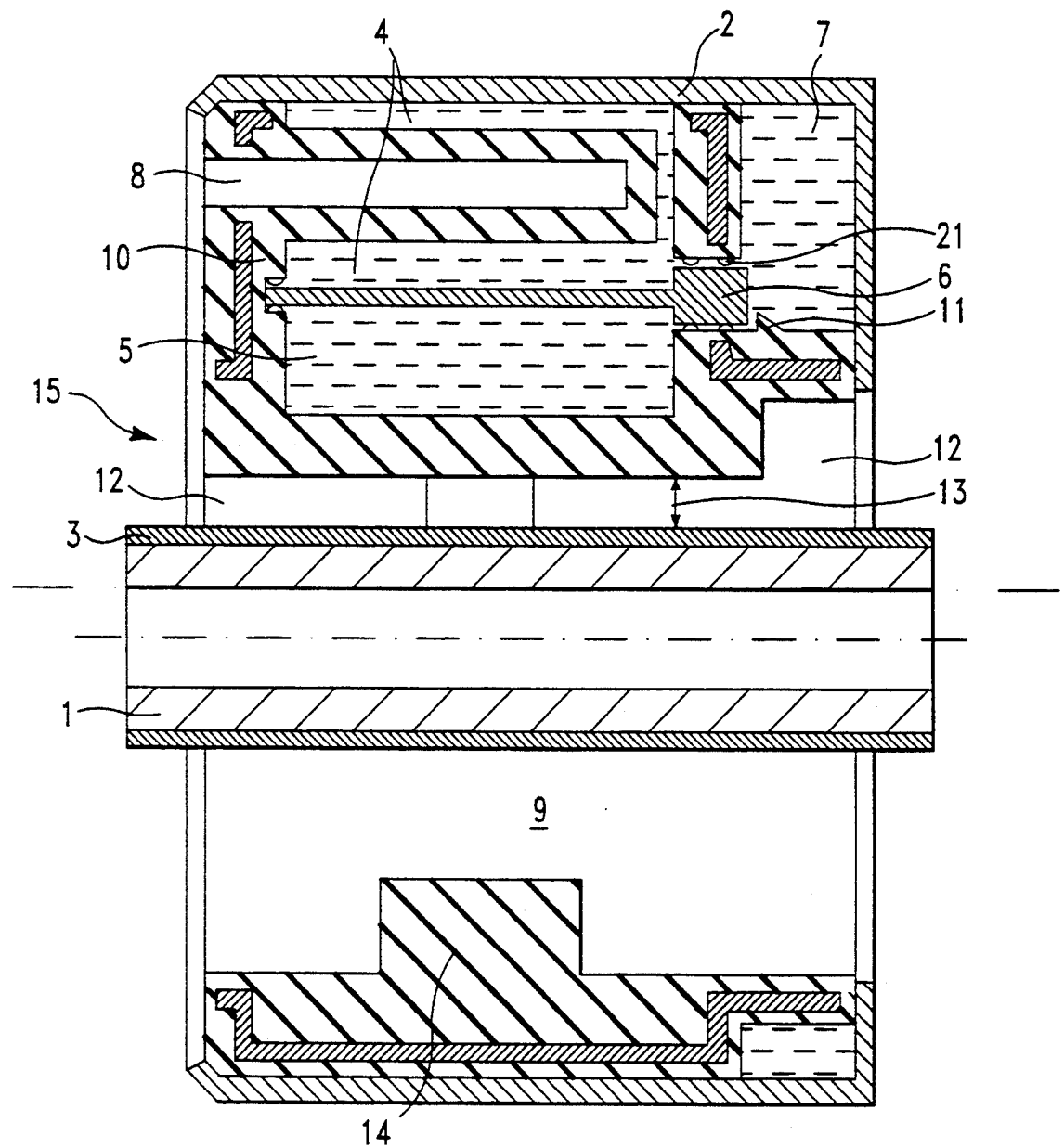
FIG. 5 is an axial section showing buffers in the cushion.
Figure 6:
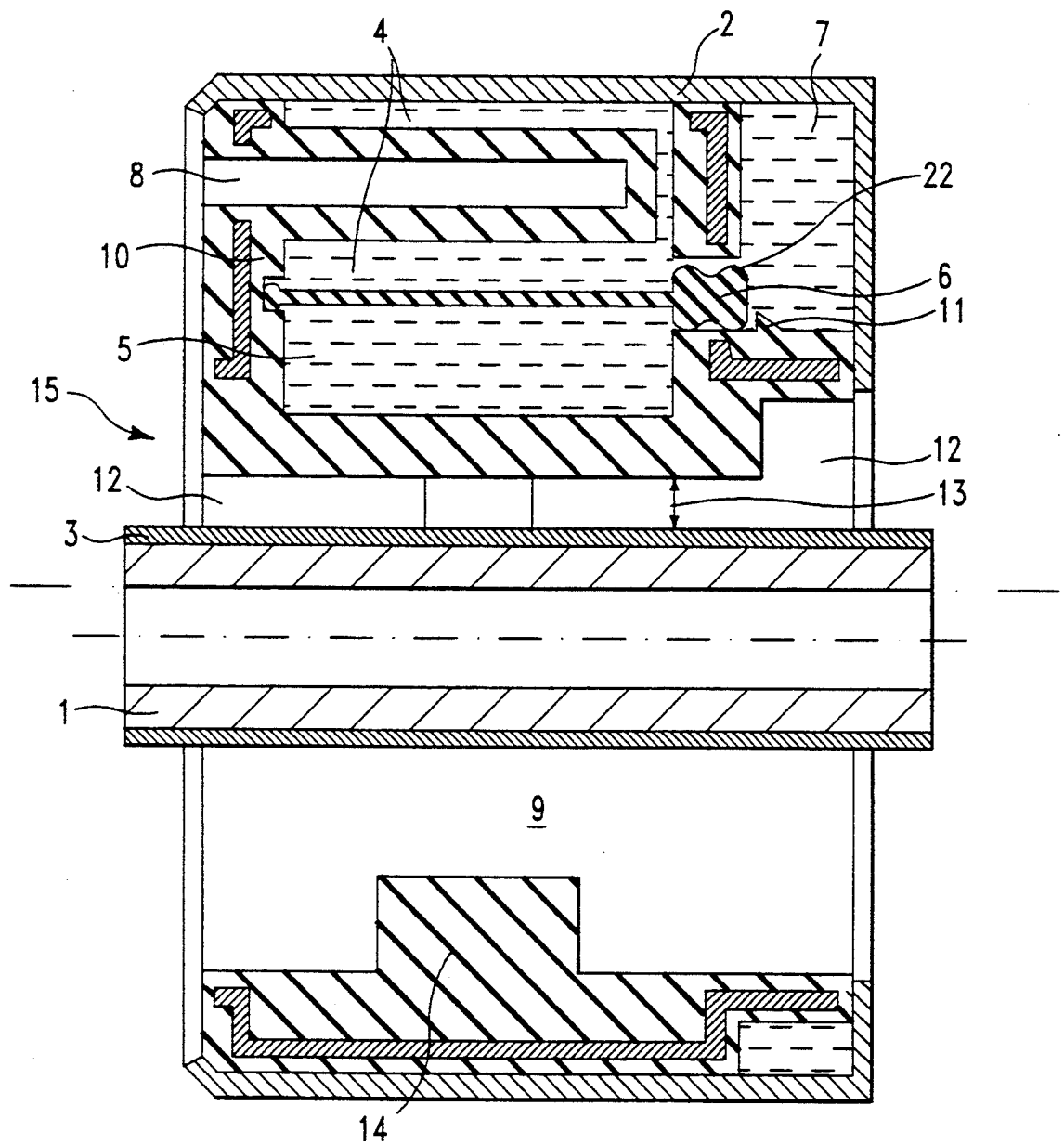
FIG. 6 is an axial section showing buffers on a rubber dividing wall.
Figure 7:
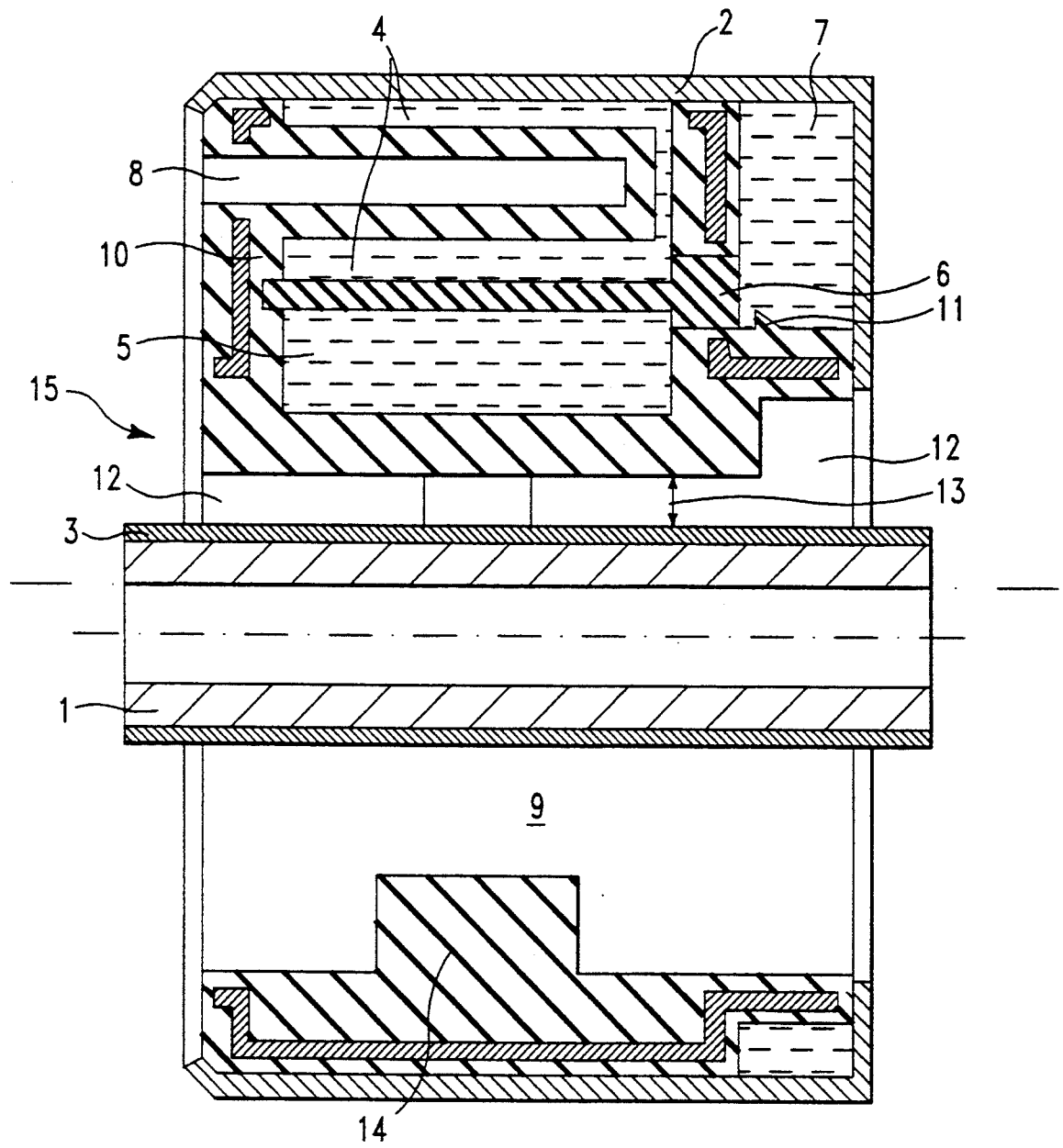
FIG. 7 is an axial section showing a rubber dividing wall closely received in the cushion.
Figure 8:
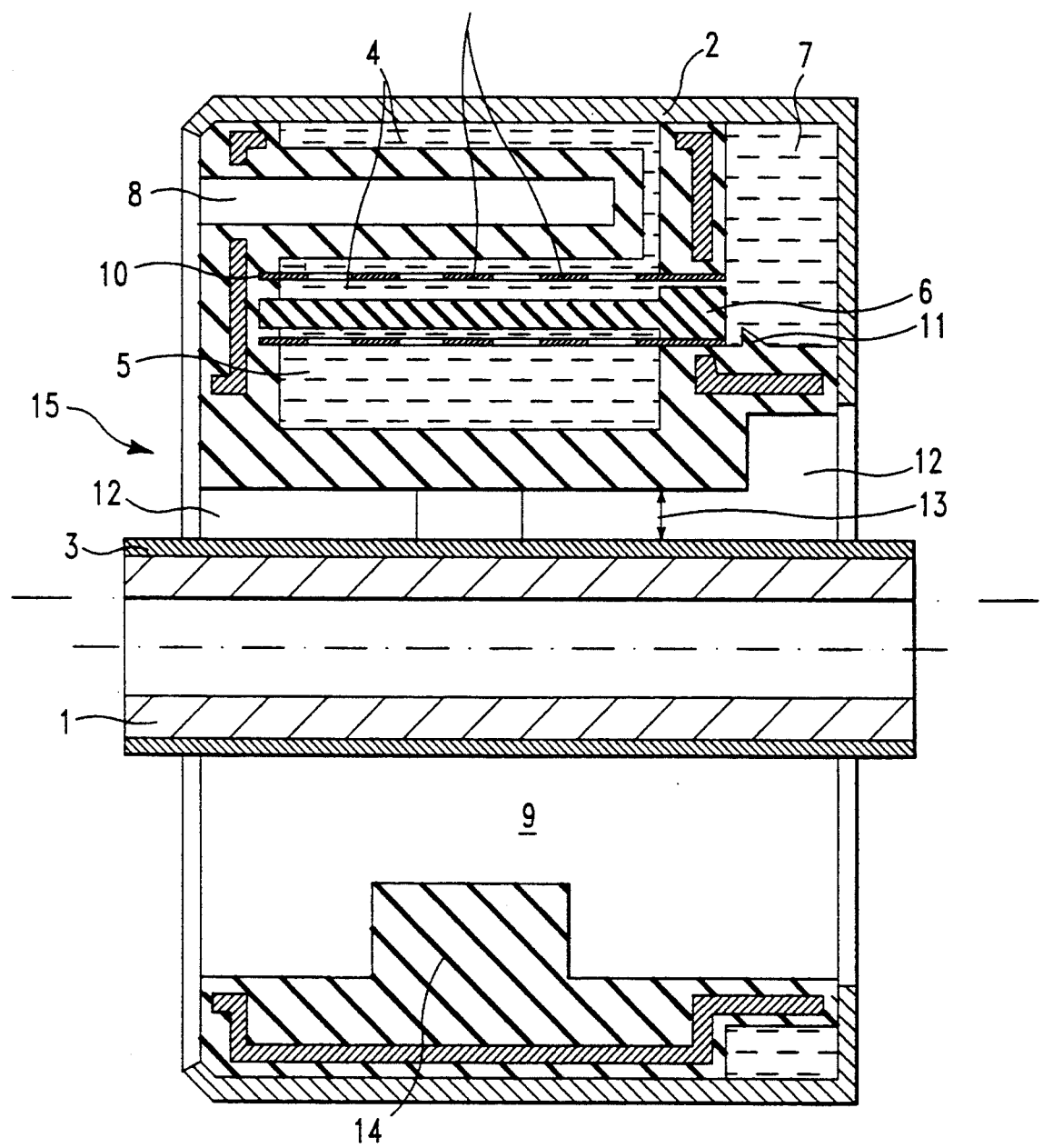
FIG. 8 is an axial section showing perforated discs in said cushion adjacent to said dividing wall.

FIGS. 5–8 are axial sections showing variations in the dividing wall separating the first and second chambers. FIG. 5 shows bump-like buffers 21 integral with the cushion in the recess 10, and also adjacent to the catch 11; these are preferred in the case of a loosely fitted metal dividing wall. Buffers 22 on the dividing wall 6 are preferred when the wall is an elastomeric diaphragm (FIG. 6). FIG. 7 shows an elastomeric diaphragm closely received in the cushion. FIG. 8 shows perforated plates 23 fixed in the cushion adjacent to an elastomeric dividing wall.

Damping properties of each of the variations depends on the material and thickness of the dividing wall and the viscosity of fluid in the working chambers. The overall design for a particular application depends on the frequency ranges to be damped and the economy of manufacture.

The foregoing is exemplary and not intended to limit the scope of the claims which follow.

I claim:

1. Hydraulically damping engine mount comprising
   an inner tube,
   an outer tube surrounding said inner tube at a radial distance therefrom,
   an elastomeric cushion between said inner tube and said outer tube, said cushion having therein first and second liquid filled working chambers which are hydraulically connected by a passage, said first and second liquid filled chambers lying between said inner tube and said outer tube,
   a vibratable dividing wall separating said first and second working chambers, and
   elastomerically deformable pocket means in said first working chamber, said pocket means defining therein a gas filled cavity which is open to atmosphere.

2. Hydraulically damping engine mount as in claim 1 wherein said dividing wall is a separate piece assembled to said cushion, said cushion having a recess which receives said dividing wall with clearance therein.

3. Hydraulically damping engine mount as in claim 2 wherein said cushion has catch means which retains said dividing wall in said recess, said dividing wall being snapped into said catch.

4. Hydraulically damping engine mount as in claim 3 wherein said dividing wall is received in said cushion with clearance adjacent to said catch.

5. Hydraulically damping engine mount as in claim 4 further comprising buffer means in said recess and in said cushion adjacent to said catch.

6. Hydraulically damping engine mount as in claim 2 wherein said dividing wall is made of elastomeric material and is closely received in said recess.

7. Hydraulically damping engine mount as in claim 2 further comprising a pair of perforated discs fixed in said cushion adjacent to said dividing wall with one said disc on each side of said dividing wall.

8. Hydraulically damping engine mount as in claim 1 further comprising at least one gas filled cavity in said elastomeric cushion, said gas filled cavity in said cushion being connected to atmosphere.

9. Hydraulically damping engine mount as in claim 8 wherein said gas filled cavity in said cushion is adjacent to said inner tube between said second working chamber and said inner tube, said second working chamber being closer to said inner tube than said first working chamber.

10. Hydraulically damping engine mount as in claim 1 wherein said passage is defined by said elastic cushion and said outer tube.

11. Hydraulically damping engine mount as in claim 1 wherein said dividing wall is an elastomerically deformable diaphragm, said diaphragm and said elastically deformable pocket means being formed integrally with said elastomeric cushion in a single vulcanized piece.

12. Hydraulically damping engine mount as in claim 1 wherein said second working chamber is closer to said inner tube than said first working chamber.

13. Hydraulically damping engine mount as in claim 1 wherein said inner tube, said cushion, and said dividing wall form a preassembled insert which is fitted axially into said outer tube.

* * * * *